(12) United States Patent
Sutedjo-The et al.

(10) Patent No.: US 11,086,893 B2
(45) Date of Patent: Aug. 10, 2021

(54) ACTIONABLE ANSWER CARD IN NATURAL LANGUAGE QUERY

(71) Applicant: salesforce.com, inc., San Francisco, CA (US)

(72) Inventors: Raymon Sutedjo-The, Oakland, CA (US); James D. Vogt, San Bruno, CA (US); Dylan Thom, San Francisco, CA (US); Vlad Eroshin, San Francisco, CA (US); Dai Duong Doan, Alameda, CA (US); Ryoji Osawa, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 263 days.

(21) Appl. No.: 15/885,351

(22) Filed: Jan. 31, 2018

(65) Prior Publication Data

US 2019/0236195 A1 Aug. 1, 2019

(51) Int. Cl.
*G06F 16/248* (2019.01)
*G06F 16/2457* (2019.01)
*G06F 16/26* (2019.01)
*G06Q 30/02* (2012.01)

(52) U.S. Cl.
CPC ...... *G06F 16/248* (2019.01); *G06F 16/24573* (2019.01); *G06F 16/26* (2019.01); *G06Q 30/02* (2013.01)

(58) Field of Classification Search
None
See application file for complete search history.

(56) References Cited

U.S. PATENT DOCUMENTS

| | | |
|---|---|---|
| 2017/0060868 A1* | 3/2017 | Rais Ghasem ... G06F 16/24522 |
| 2017/0118308 A1* | 4/2017 | Vigeant .................. H04N 7/15 |
| 2017/0235448 A1* | 8/2017 | Kammath ............ G06F 16/128 715/736 |

* cited by examiner

*Primary Examiner* — Giuseppi Giuliani
(74) *Attorney, Agent, or Firm* — Sterne, Kessler, Goldstein & Fox P.L.L.C.

(57) ABSTRACT

System, method, and computer product embodiments are described for querying a database using natural language queries (NLQ) to produce actionable results in an answer card. The method allows a user to take further action with the answer card by editing the card contents, manipulating the way data is displayed, or querying the answer results for more details of the data. By the method, the user may continue exploration of the data, use the results to collaborate with others, or build a story from the data in a presentation format, such as a dashboard, while maintaining access to the real-time data of the database through the answer card. System and computer product embodiments implement the method.

19 Claims, 8 Drawing Sheets

ACTIONABLE ANSWER CARD IN NATURAL LANGUAGE QUERY

CROSS-REFERENCE TO RELATED APPLICATIONS

This application is related to U.S. patent application Ser. No. 15/885,430, filed Jan. 31, 2018, entitled "Typeahead and Autocomplete for Natural Language Queries", the entirety of which is hereby incorporated by reference.

BACKGROUND

Typical database management systems (DBMS) consist of an integrated set of computer software that allows users to interact with one or more databases and to access the data contained in the database(s). A DBMS allows entry, storage, and retrieval of large quantities of information and, coupled with data analytics software, provides a user means to manage how that information is organized and presented.

For example, dashboards within a data analytics software platform can help a business user visualize changing business conditions in the form of visual reports to make decisions based on real-time data. Dashboards help users identify trends, regroup data by varying parameters, sort out quantities, and measure the impact of their activities. But querying complex data to focus results on a specific answer can be difficult and time consuming. Furthermore, once results are obtained, results are merely snapshots of the data for the query at the time that it was run. Typical data analytics packages do not provide means to continue work with query results in a comprehensive manner to better focus the answer to a user's question about the data while maintaining access to the same data in real-time.

Many database query applications are not capable of querying by natural language. Even if they do query by natural language, some applications that create answer cards from query results cannot do anything further with the answer card once it is created. Some applications are able to create a presentation component with a query answer but cannot save changes to an existing component after it is presented in a dashboard, for example. No application allows natural language querying in which a user is able to take further action with query results in natural language, make and save content and formatting updates using real-time data, and share the results with other users who can do the same.

With typical applications, the user must start over with a new query if the answer content does not fit the user's needs or if the answer content is in a presentation format that the user determines is not appropriate for the audience. The user's work flow is thus halted and some work must be performed again to arrive at new results, creating inefficiencies and frustration for the user.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Conversations and stories are how people naturally communicate and interface with each other. Framing experiences as conversation results in greater efficiency and productivity and higher engagement. It also reduces the learning curve and other challenges of using a new tool by making its methods as simple and natural as a conversation. For example, Natural Language Query (NLQ) can aid a business user in setting up database queries. NLQ enables business users to ask a question about a dataset in the context of a visual view of the data, such as a dashboard or app, without knowing the details about the data structure that went into building the view. Multiple users can converse about the data without having specific knowledge about the database contents as long as the users know the general business context of the database. For example, users do not need to know specific measures, dimensions, filters, and similar data parameters before querying the data. The initial querying and subsequent use of the data can be approached conversationally, that is, in the language that a user would normally use to talk to another human being.

Disclosed herein are methods, systems, and computer program products that enable a user to ask questions about data in a database using natural language in a "conversational" graphical user interface (GUI) and receive quick answers that the user can further manipulate. By way of non-limiting examples, the answers can be displayed in a dashboard, opened and edited in an explorer view, shared with collaborators, or further queried or manipulated using natural language in other applications that are configured to use NLQ within the data analytics system. As in a conversation between two parties, the methods, systems, and computer products allow, as a key feature, the user to have a back-and-forth conversation with the database to further focus the user's query results on exactly what the user seeks to know, and to make available to the user a history of the conversation so that any previous question can be revisited and further queried for additional action on real-time data.

Further efficiencies are made by predicting what the user might want to know, presenting options to the user based on a past or current query, guiding the user in entering query content, terminology, or format depending on the database being queried, and allowing the user to make changes to a query to refocus results, drill down into the data, or change the presentation without having to start over with a fresh query. An actionable answer card builds on the natural language query feature by allowing a user to continue the user's workflow, whether it is to add query information to a dashboard that the user is building or to modify a previously created chart to the user's liking.

"NLQ," or "natural language query," as used herein, refers to interrogating a database about specific content, where the query consists only of standard terms in the user's natural language, without any special syntax or format. A query can be built using terms in any form, including a statement (or full sentence), a question, or a list of keywords. A processing engine processes the terms in the query input text.

"Template," as referred to herein, is a software representation of a lookup tree for parsing analytics queries. In the exemplary embodiment, a template consists of a list of predefined natural language queries in English form that would closely match a human user's predicted questions about data in a database. Each natural language query is mapped to a predefined Analytics Query Language (AQL) query. Once a user's question is matched to a natural language query in the template, the corresponding AQL query will be able to load input data, operate on it, and output the results data. Further information on templates as referred to herein can be found in U.S. patent application Ser. No. 15/885,430, "Typeahead and Autocomplete for Natural Language Queries."

The "NLQ input," as referred to herein, can be, for example, a GUI box with a cursor for free-form typing of text, a drop-down menu from which a text item can be selected with a click of a mouse, or other user-selectable input. The exemplary embodiment is described herein as a free-form text box for typing from a cursor, with alternative selectable text to fill in the free-form text box. When the cursor is inside the NLQ input box, the method will accept a user's typing of "Enter" on a keyboard or other similar computing device input, for example, at any time to submit the text as a query.

Figure 1:
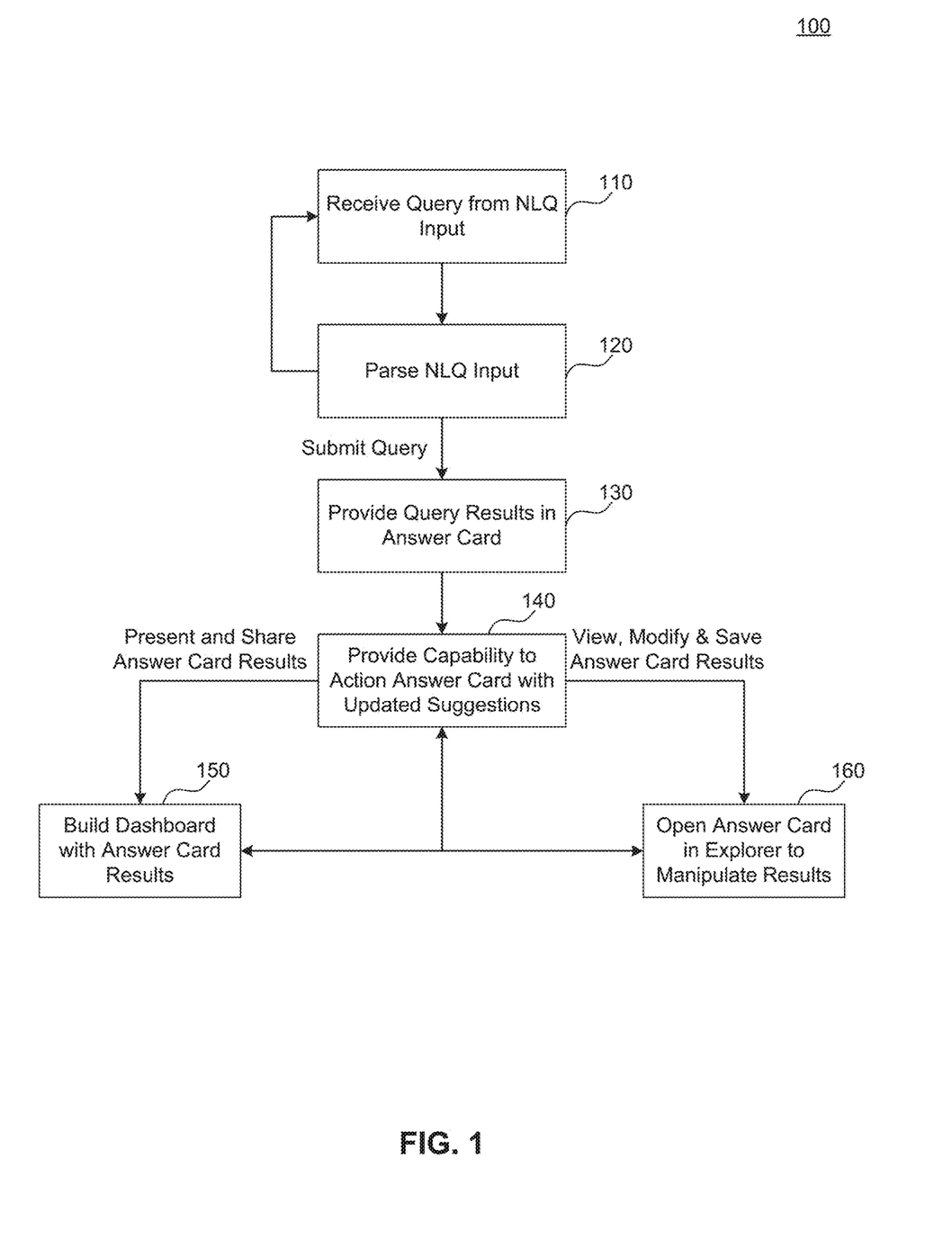
FIG. 1 shows a flow chart depicting the process steps of the method for creating and editing an actionable answer card for natural language queries.

FIG. 1 illustrates a flow chart of a method 100, showing an embodiment of a combination of process steps to (110) receive a query from an NLQ input, (120) parse the NLQ input, (130) provide query results once the user submits the query, (140) provide the capability to action the answer card, along with suggestions to the user for drilling down into the data, (150) allow the user to build a dashboard with the answer card results if the user desires to present and share the results, and (160) allow the user to open the answer card results in an explorer view if the user desires to view and/or modify and save new answer card results. Until the user desires to submit the query (by pressing "Enter" on a keyboard or other computing input device, for example), the method will allow the user unlimited attempts to enter a query input into the NLQ input box, modify the entry, and/or select alternative query suggestions, while the input is continuously parsed by the NLQ parser (for example, by a template) and new query suggestions are offered to the user (for example, according to the details as disclosed in U.S. patent application Ser. No. 15/885,430, "Typeahead and Autocomplete for Natural Language Queries").

The method 100 allows the user a choice to present, share, view, modify, or save the answer card results at any time in continuous workflow, moving between a dashboard and explorer editing view as desired, until the user is satisfied with the results and stops the workflow (i.e., halts action on the answer card). The method 100 is not limited to this example embodiment. It is to be appreciated that, depending on the analytics platform and specific GUI implementing the method, the embodiments of the steps may vary. Not all steps may be needed to perform the disclosure provided herein. Further, some of the steps may be performed simultaneously, or in a different order than as shown in FIG. 1, as will be understood by a person of ordinary skill in the relevant art. It will also be appreciated by one skilled in the art that a wide range of other actions (e.g., data manipulation or formatting) is possible to perform on the answer card under this method.

Figure 2:
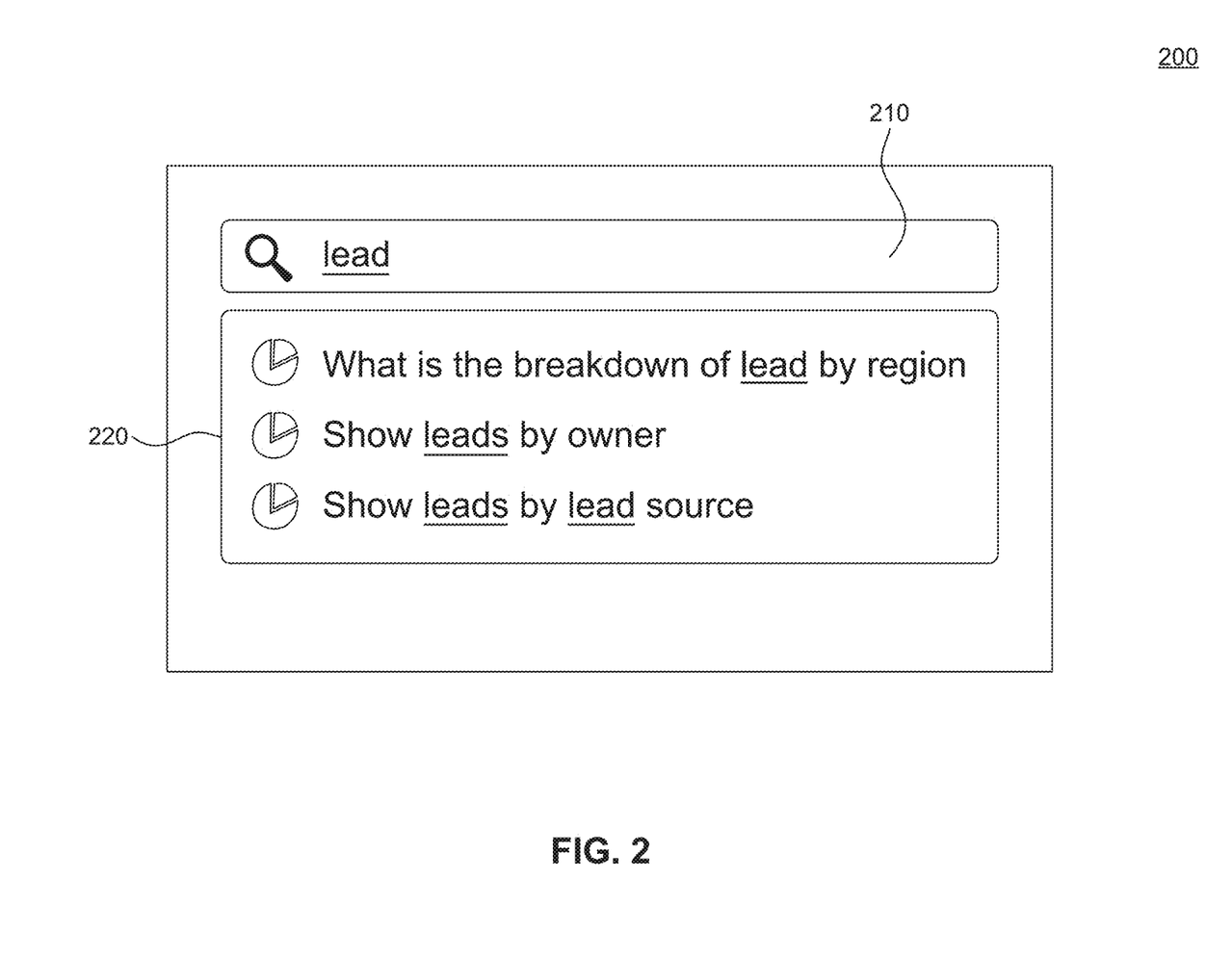
FIG. 2 illustrates the NLQ input box of an exemplary embodiment of a graphical user interface (GUI) that accepts a user query, wherein the method displays query suggestions below the box, depending on what the user types into the box.

FIG. 2 illustrates the NLQ input box 210 of an exemplary embodiment of a GUI 200 that accepts a user query. As illustrated, a user types in a question or identifying phrase about the data in the database using natural language. As the user types in the free-form text box 210, the method displays query suggestions 220 below the box, depending on what the user types into the box and what data is available to query in the database. For example, for data containing information on sales opportunities, a user may want to know information on who or what the potential leads are for those opportunities or any other statistics about those leads. If a user types in simply "leads," the method will parse the input and suggest the types of questions that the user may ask about the data for which relevant results exist in the database. As shown in the FIG. 2 example, one of those query suggestions could be "What is the breakdown of lead by region?" in a list 220 under the NLQ input box. The method will highlight the keyword "lead" in the available suggested queries.

In the exemplary embodiment, the query suggestions are provided, for example, by a lookup template, which is further detailed in U.S. patent application Ser. No. 15/885,430, "Typeahead and Autocomplete for Natural Language Queries." The user may choose one of the suggested queries by clicking on a query in the dropdown list 220, or the user may continue to type in the free-form text box 210 with other keywords, which the method will attempt to match to the template for further suggestions. Once the user is satisfied with the query entry in the NLQ input box 210, the user may type "Enter" on a keyboard, for example, or other data entry device, to submit the query. Various NLQ parsers, other than the example template described herein, may be used to parse the NLQ input, as would be appreciated by a person of ordinary skill in the art.

A person of ordinary skill in the art will appreciate that a GUI implementing the method may take on various forms or appearances to satisfy the same functionality as illustrated in FIG. 2. It will also be understood that the types of queries that can be generated may vary greatly depending on the contents of the database, with relevant measure keywords such as "sales," "leads," "time to close," "revenue," "records count," or "products count," and dimension keywords such as "opportunity stage," "lead source," "industry," or "region," for example. The GUI may also accept variations of terms that can be interpreted by the system to arrive at the desired query. Measures are quantitative; thus, when a user enters a term such as "records" or "products," for example, that represent an item, the system can interpret these as "records count" or "products count," or "number of records" or "number of products," respectively. Dimensions are categorical; similarly, it is to be appreciated that the system can interpret categorically similar terms to arrive at the desired query part.

Figure 3:
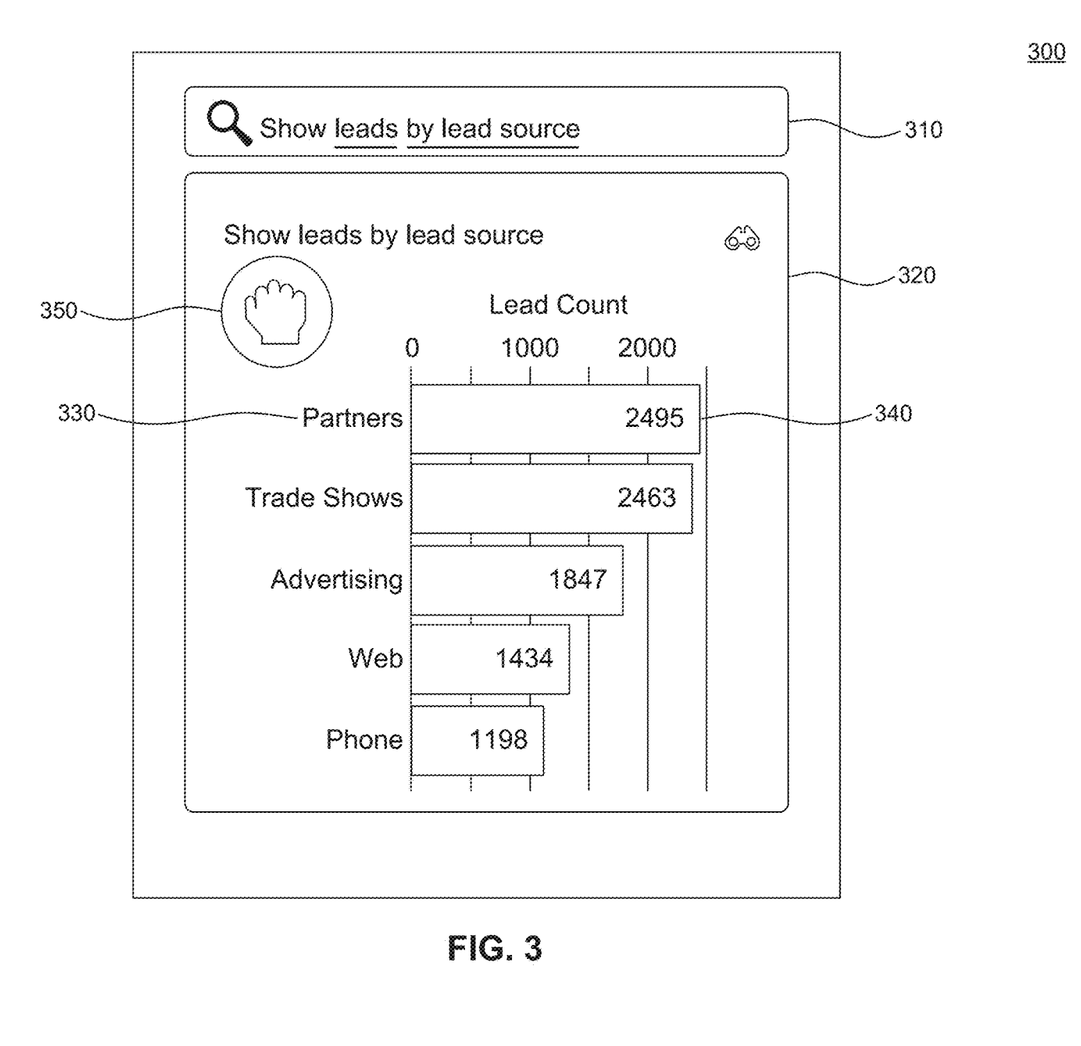
FIG. 3 illustrates an actionable answer card that results from a user query.

FIG. 3 illustrates an exemplary embodiment of a GUI 300 with an actionable answer card 320 that results from a user's query input 310 after the user submits the query. Building on the FIG. 2 example, in the case that a user had chosen and submitted the suggested query "Show leads by lead source" as an NLQ input 310, the method will generate and display an answer card 320 with the associated results. The method in the example embodiment forms the answer card as a bar chart by listing the lead source, for example "Partners" 330, on the Y-axis of the chart and the number of leads 340 on the X-axis of the chart. In the example embodiment, the chart type is chosen automatically by the method using a default representation that best displays the data types. A person of ordinary skill in the art would appreciate that the GUI may include functionality enabling the user to select the type of chart to be displayed. The answer card in the exemplary embodiment may be further actioned, such as dragging 350 the card into another GUI, as will be illustrated in the following examples.

Figure 4:
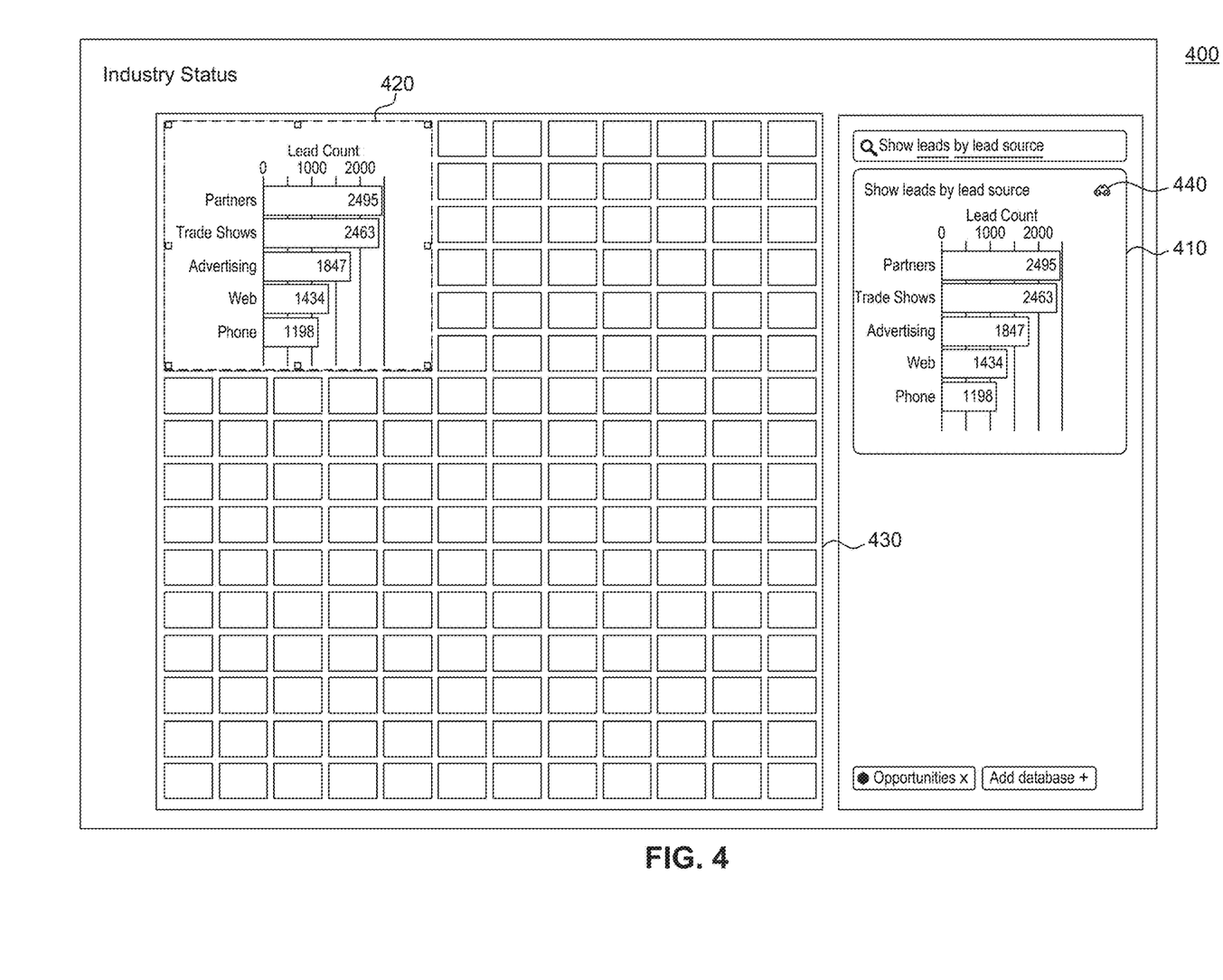
FIG. 4 illustrates an actionable answer card dragged and dropped into a dashboard builder embodiment.

FIG. 4 illustrates an exemplary embodiment of a GUI 400 with an actionable answer card 410 dragged and dropped into a dashboard builder 430 for subsequent display or editing of the same answer card 420. It must be stressed that the answer card 420 is a repeated instance of the same data display pointing to the same dataset in the same database as for answer card 410. The data shown is in real-time such that if the data is modified in the database, the answer card in either location will show the modified data when the respective answer card is refreshed. By first moving the answer card 410 into the dashboard builder 430, the user may use the answer card 420 to build a dashboard for display or sharing of the information, for example. Embodiments disclosed herein allow the answer card 420 to be further edited after it is added to the dashboard; that is, the data never becomes static just because it is displayed in a presentation format. This is because the answer card, when moved into another application such as the dashboard builder, is moved with pointers to the real-time data. The data pointers are moved seamlessly with the answer card, allowing the user to perform further action on the answer card contents in continuous workflow, no matter where the answer card has been moved. The answer card 410 may also be opened directly in an explorer view for editing of the answer card contents by clicking on the explore icon 440 in the original answer card GUI.

Figure 5A:
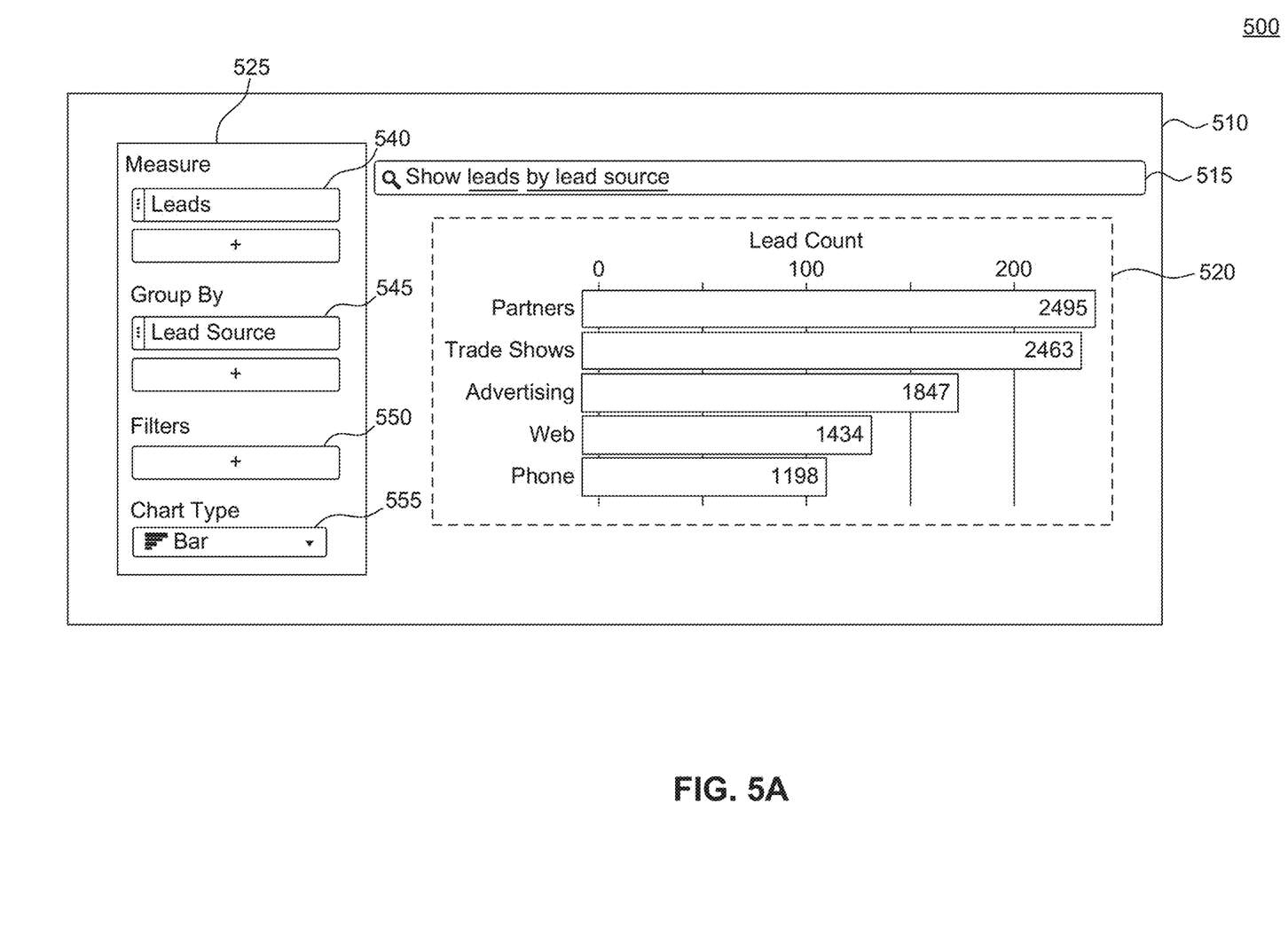
FIG. 5A illustrates an actionable answer card opened in an exemplary embodiment of an explorer view for further editing.

FIG. 5A illustrates an exemplary embodiment of a GUI 500 with the contents of an actionable answer card 520 opened in an explorer view 510 for further editing. When opened in explorer view 510, the original query in the NLQ input box 515, here "Show leads by lead source," is displayed above the contents of the answer card 520. The user thus is reminded of the answer card contents, even after the answer card is moved to the explorer view. The user also has a view into the answer card contents by the explorer panel 525, which displays the parameters that make up the answer card (here, the measure "leads," grouped by the dimension "lead source," with no other filter, and displayed in a bar chart). To modify the answer card contents, the user may type into the NLQ input box 515 other query terms and submit them, in the same way that the user first generated the original answer card. The user may also use the explore panel 525 to query on specific terms 540, add a new group-by term 545, add a new filter term 550, or select a new chart type 555 from a drop-down menu of chart types. Although not illustrated in the exemplary embodiment of FIG. 5A, the user may similarly remove a term from the original answer card. A person of ordinary skill in the art will appreciate that other actionable GUI components could be incorporated into the GUI as means to modify the answer card, such as drop-down menus to select query terms, icons or buttons to affect a change in the answer card, or drag-and-drop items from a list.

Figure 5B:
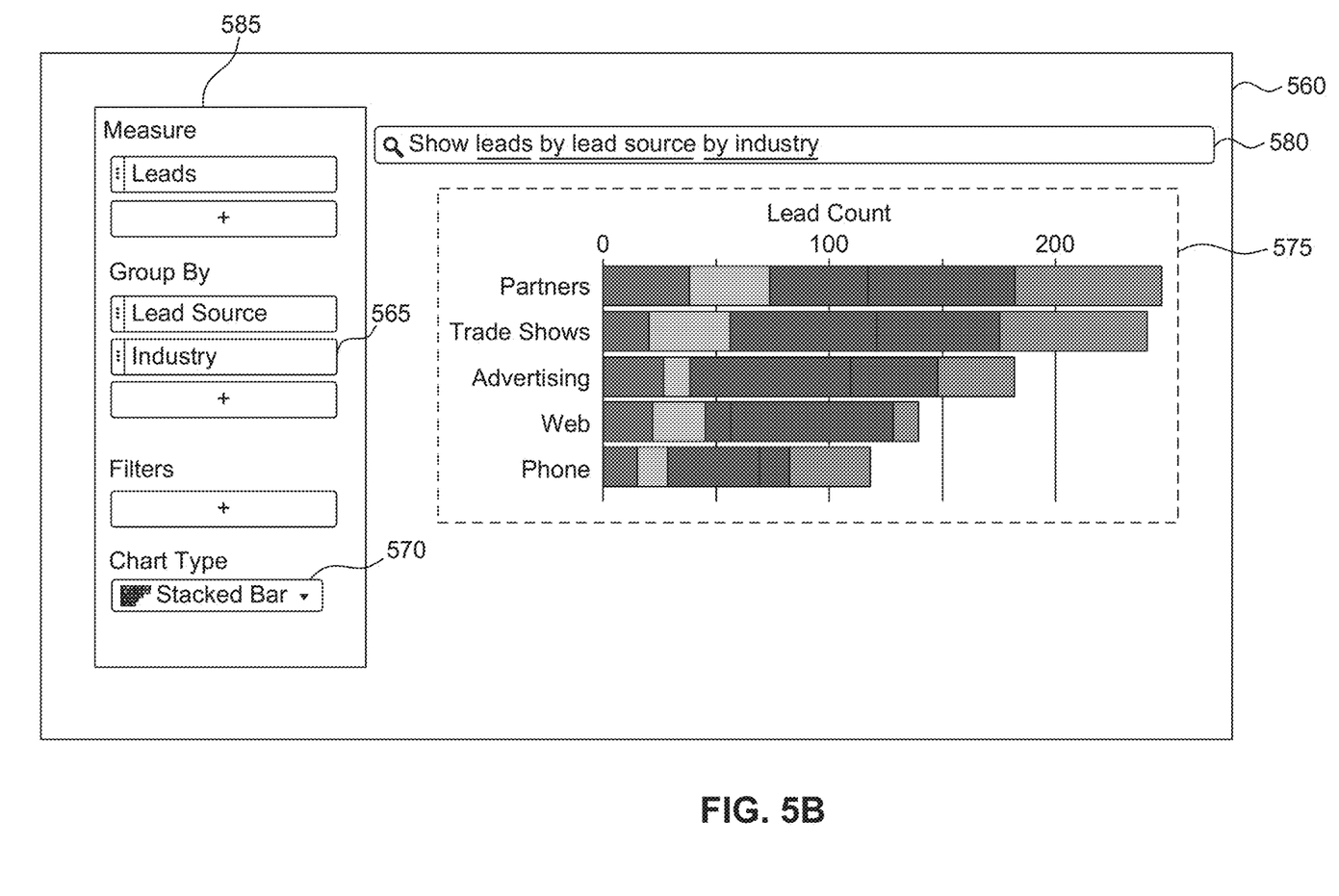
FIG. 5B illustrates an answer card that has been modified in an explorer view and that can be further edited.

FIG. 5B illustrates a modified answer card version of the FIG. 5A answer card 500 in the same explorer view 560. Note that by adding the group-by term "Industry" 565 and selecting a stacked bar as the chart type 570, for example, the displayed answer card 575 changes to show the new query parameters. The NLQ input box 580 simultaneously indicates the associated query, "Show leads by lead source by industry." In the exemplary embodiment, these new answer card contents can be modified again and again by a user by following the same process—either by changing the query terms in the NLQ input box 580 or by setting query terms in the explore panel 585.

Figure 6:
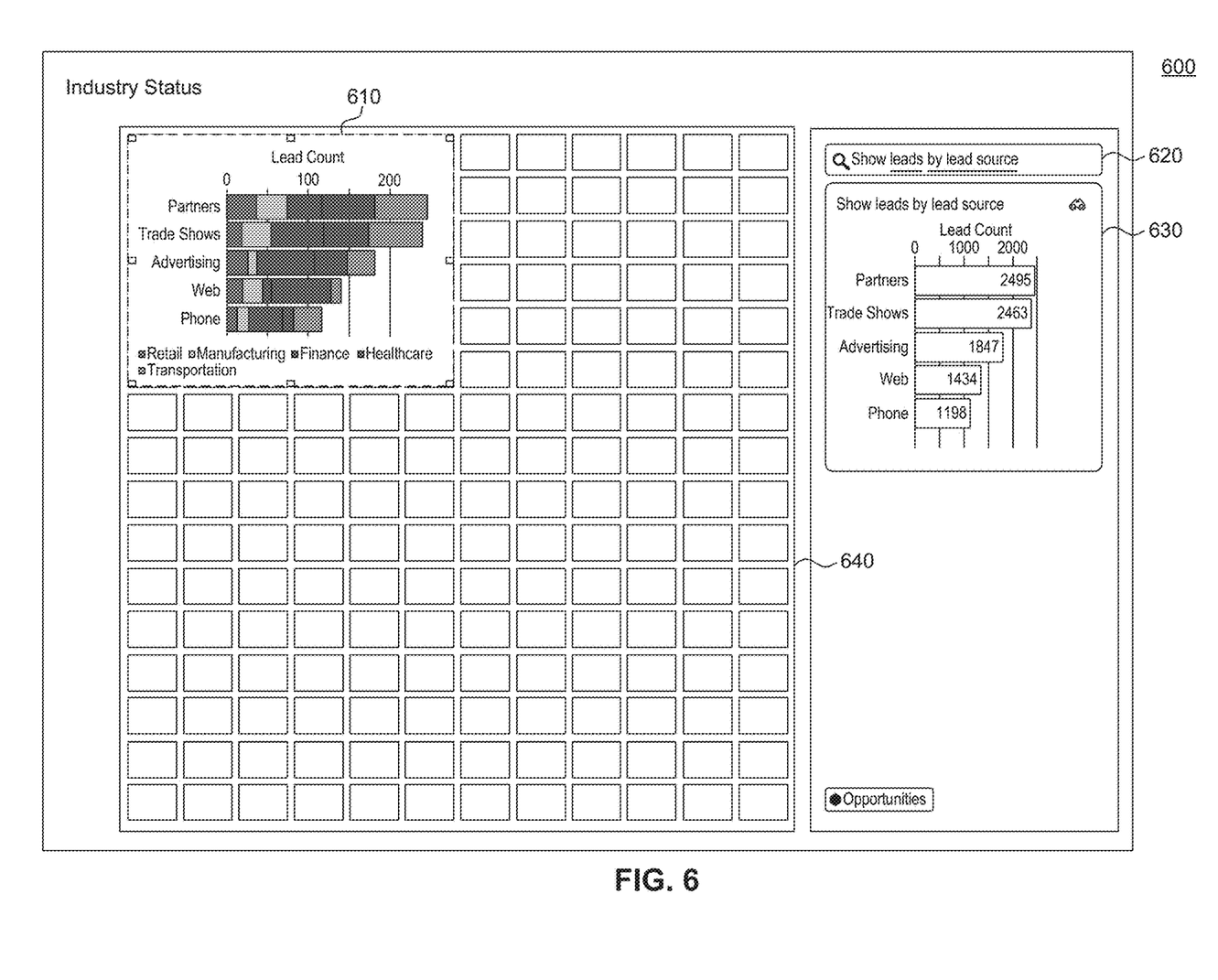
FIG. 6 illustrates the edited answer card as appearing in a dashboard builder after the explorer view has been closed.

FIG. 6 illustrates the updated answer card 610 as appearing in the dashboard builder 640 of a data analytics GUI 600 after the explorer (editing) view has been closed. When the explorer view is closed and editing is complete there, the resulting answer card 610 can be seen effectively side-by-side with the original answer card 630. Thus, the user may easily see the differences between the two answer card versions. The user may also reopen the updated answer card 610 in the explorer view by double clicking on it and then further editing the answer card if the user is not satisfied with the first updates. It will be appreciated that the original query is maintained in the NLQ input box 620 and can be edited yet again, in a different way, for example by showing leads by a different grouping, to create a new updated answer card to add to the dashboard builder. In this way, the user may edit the original answer card again and again and produce several different instances of an updated answer card, showing different analytics and populating a single dashboard with various views of the data. Each instance can be reopened and tweaked as the user desires, and with each update, the user accesses the real-time data of the database. A person of ordinary skill in the art will appreciate that the answer cards are, in essence, living embodiments of analytics data, appearing statically if the user desires to report a snapshot of the data in a dashboard, but otherwise being fully editable to explore, manipulate, and analyze the contents of the loaded database.

Computer System Implementation

Figure 7:
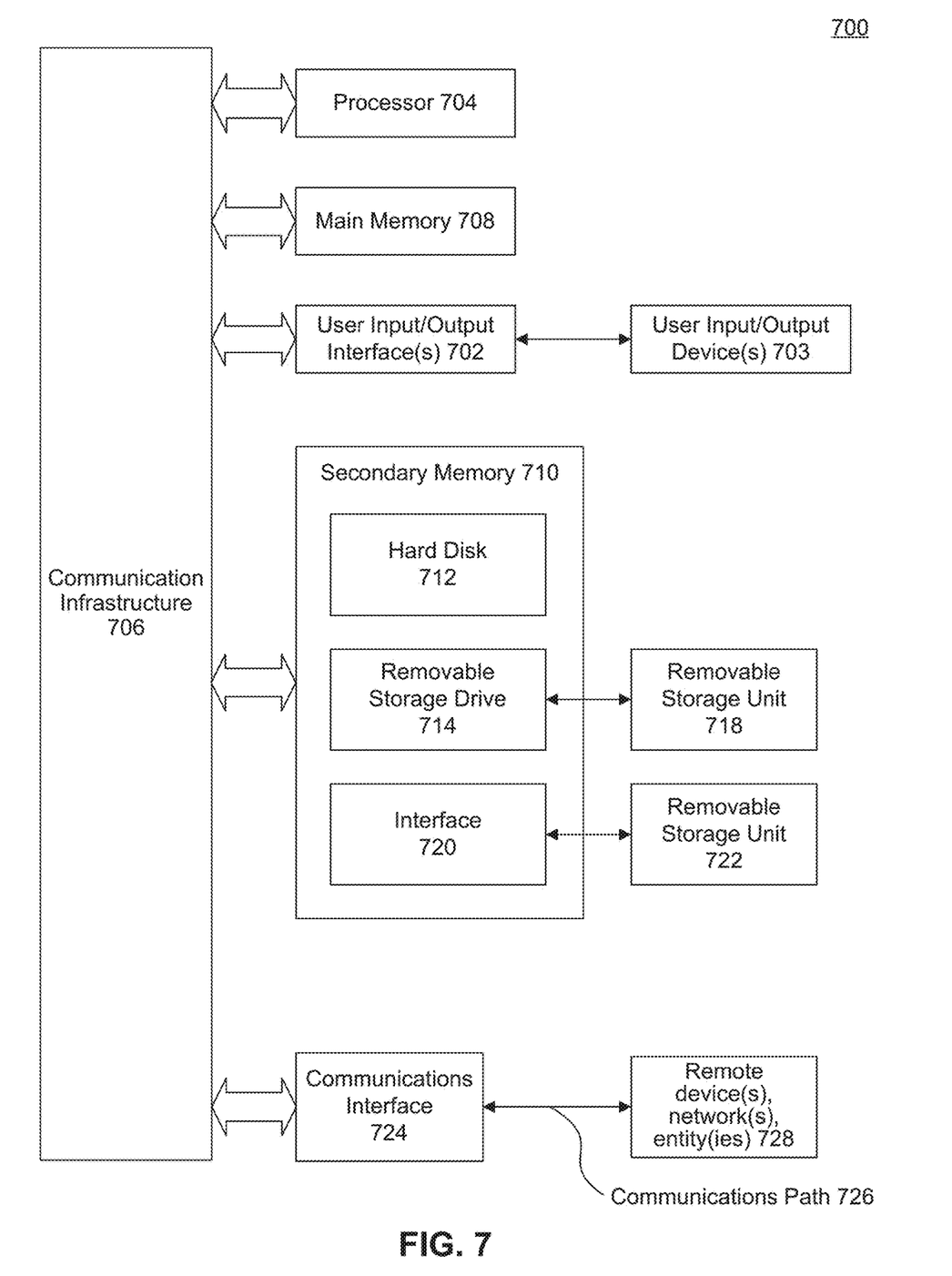
FIG. 7 illustrates an example computer system useful for implementing various embodiments.

Various embodiments of the actionable answer card using NLQ may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 or a removable storage device or drive 714. Removable storage drive 714 may be a floppy disk drive, a magnetic tape drive, a compact disk drive, an optical storage device, tape backup device, or any other storage device/drive.

Removable storage drive 714 may interact with a removable storage unit 718. Removable storage unit 718 may include a computer usable or readable storage device having stored thereon computer software (control logic) or data. Removable storage unit 718 may be a floppy disk, magnetic tape, compact disk, DVD, optical storage disk, or any other computer data storage device. Removable storage drive 714 may read from or write to removable storage unit 718.

Secondary memory 710 may include other means, devices, components, instrumentalities, or other approaches for allowing computer programs or other instructions or data to be accessed by computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 700 may further include a communications or network interface 724. Communications interface 724 may enable computer system 700 to communicate and interact with any combination of external devices, external networks, external entities, etc. (individually and collectively referenced by reference number 728). For example, communications interface 724 may allow computer system 700 to communicate with external or remote devices 728 over communications path 726, which may be wired or wireless (or a combination thereof), and which may include any combination of LANs, WAN, the Internet, etc. Control logic or data may be transmitted to and from computer system 700 via communications path 726.

Computer system 700 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 700 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art how to make and use embodiments of this disclosure using data processing devices, computer systems, or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
receiving, by a computing device, a natural language query (NLQ) input configured to query analytics content of real-time data;
creating, by the computing device, an answer card comprising query results to the NLQ input, wherein the answer card is configured to update the query results based on the real-time data;
displaying, by the computing device, the answer card comprising the query results within an analytics application;
editing, by the computing device, the answer card and saving changes to the answer card from within the analytics application;
displaying, by the computing device and in response to a request to add the answer card to a dashboard builder, a repeated instance of the answer card within the dashboard builder, wherein the dashboard builder is configured to display a plurality of answer cards, and wherein the answer card is displayed adjacent to the dashboard builder while the repeated instance of the answer card is displayed within the dashboard builder;
editing, by the computing device, the repeated instance of the answer card and saving changes to the repeated instance of the answer card within the dashboard builder, wherein the answer card and the repeated instance of the answer card are concurrently displayed after editing the repeated instance of the answer card; and
sharing, by the computing device, the answer card from the analytics application to another application by transmitting the NLQ input, wherein the answer card continues to be editable.

2. The method of claim 1, wherein the saving changes to the answer card comprises:
saving a pointer to a database containing the real-time data that was queried;
saving the NLQ input; and
saving a static representation of the answer card with the query results.

3. The method of claim 2, wherein the answer card is configured to be opened to access the pointer to the database, the NLQ input, and the static representation of the answer card with the query results, the method further comprising opening the answer card.

4. The method according to claim 1, wherein the editing the answer card comprises:
running a second query on the analytics content by limiting a first query.

5. The method of claim 1, wherein the editing the repeated instance comprises:
opening the repeated instance of the answer card in an explorer window comprising a plurality of GUI widgets for editing the repeated instance of the answer card,
wherein the repeated instance of the answer card comprises a chart, and
wherein the plurality of GUI widgets comprises a drop-down list for changing a type of the chart.

6. The method of claim 1, further comprising:
receiving an edit to the NQL input;
generating an updated answer card based on the edit to the NQL input; and
adding the updated answer card to the dashboard builder for concurrent display with the repeated instance of the answer card.

7. The method of claim 1, wherein the request comprises a drag and drop operation associated with the answer card.

8. A system, comprising:
a memory; and
at least one processor coupled to the memory and configured to:
receive a natural language query (NLQ) input configured to query analytics content of real-time data;
create an answer card comprising query results to the NLQ input, wherein the answer card is configured to update the query results based on the real-time data;
display the answer card comprising the query results within an analytics application;
edit the answer card and save changes to the answer card from within the analytics application;
display, in response to a request to add the answer card to a dashboard builder, a repeated instance of the answer card within the dashboard builder, wherein the dashboard builder is configured to display a plurality of answer cards, and wherein the answer card is displayed adjacent to the dashboard builder while the repeated instance of the answer card is displayed within the dashboard builder;
edit the repeated instance of the answer card and save changes to the repeated instance of the answer card within the dashboard builder, wherein the answer card and the repeated instance of the answer card are concurrently displayed after editing the repeated instance of the answer card; and
share the answer card from the analytics application to another application by transmitting the NLQ input, wherein the answer card continues to be editable.

9. The system of claim 8, wherein the saving changes to the answer card comprises:
saving a pointer to a database containing the real-time data that was queried;
saving the NLQ input; and
saving a static representation of the answer card with the query results.

10. The system of claim 9, wherein the answer card is configured to be opened to access the pointer to the database, the NLQ input, and the static representation of the answer card with the query results.

11. The system according to claim 8, wherein the editing the answer card comprises:
running a second query on the analytics content by limiting a first query.

12. The system of claim 8, wherein the editing the repeated instance of the answer card comprises:
opening the repeated instance of the answer card in an explorer window comprising a plurality of GUI widgets for editing the repeated instance of the answer card,
wherein the repeated instance of the answer card comprises a chart, and
wherein the plurality of GUI widgets comprises a drop-down list for changing a type of the chart.

13. The system of claim 8, wherein the at least one processor is further configured to:
  receive an edit to the NQL input;
  generate an updated answer card based on the edit to the NQL input; and
  add the updated answer card to the dashboard builder for concurrent display with the repeated instance of the answer card.

14. A non-transitory computer-readable medium having instructions stored thereon that, when executed by a computing device, causes the computing device to perform the operations comprising:
  receiving a natural language query (NLQ) input configured to query analytics content of real-time data;
  creating an answer card displaying query results to the NLQ input, wherein the answer card is configured to update the query results based on the real-time data;
  displaying the answer card comprising the query results within an analytics application;
  editing the answer card and saving changes to the answer card from within the analytics application;
  displaying, in response to a request to add the answer card to a dashboard builder, a repeated instance of the answer card within the dashboard builder, wherein the dashboard builder is configured to display a plurality of answer cards, and wherein the answer card is displayed adjacent to the dashboard builder while the repeated instance of the answer card is displayed within the dashboard builder;
  editing the repeated instance of the answer card and saving changes to the repeated instance of the answer card within the dashboard builder, wherein the answer card and the repeated instance of the answer card are concurrently displayed after editing the repeated instance of the answer card; and
  sharing the answer card from the analytics application to another application by transmitting the NLQ input, wherein the answer card continues to be editable.

15. The non-transitory computer-readable medium of claim 14, wherein the operations performed for the saving changes to the answer card further comprise:
  saving a pointer to a database containing the real-time data that was queried;
  saving the NLQ input; and
  saving a static representation of the answer card with the query results.

16. The non-transitory computer-readable medium of claim 15, wherein the answer card is configured to be opened to access the pointer to the database, the NLQ input, and the static representation of the answer card with the query results.

17. The non-transitory computer-readable medium according to claim 14, wherein the editing the answer card comprises:
  running a second query on the analytics content by limiting a first query.

18. The non-transitory computer-readable medium of claim 14, wherein the editing the repeated instance comprises:
  opening the repeated instance of the answer card in an explorer window comprising a plurality of GUI widgets for editing the repeated instance of the answer card,
  wherein the repeated instance of the answer card comprises a chart, and
  wherein the plurality of GUI widgets comprises a drop-down list for changing a type of the chart.

19. The non-transitory computer-readable medium according to claim 14, the operations further comprising:
  receiving an edit to the NQL input;
  generating an updated answer card based on the edit to the NQL input; and
  adding the updated answer card to the dashboard builder for concurrent display with the repeated instance of the answer card.

* * * * *